Sept. 15, 1925.
C. GIRL
AUTOMOBILE BUMPER
Filed Jan. 16, 1922
1,553,999
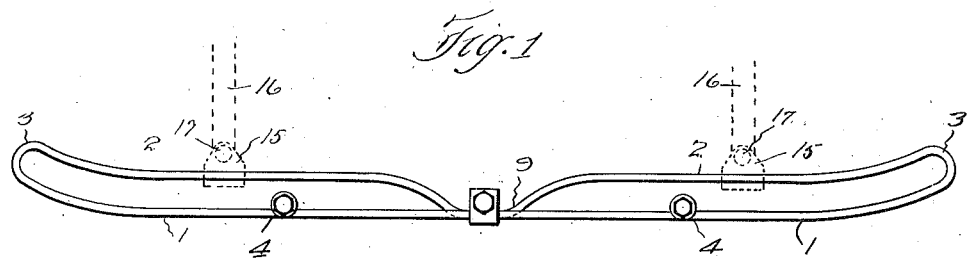
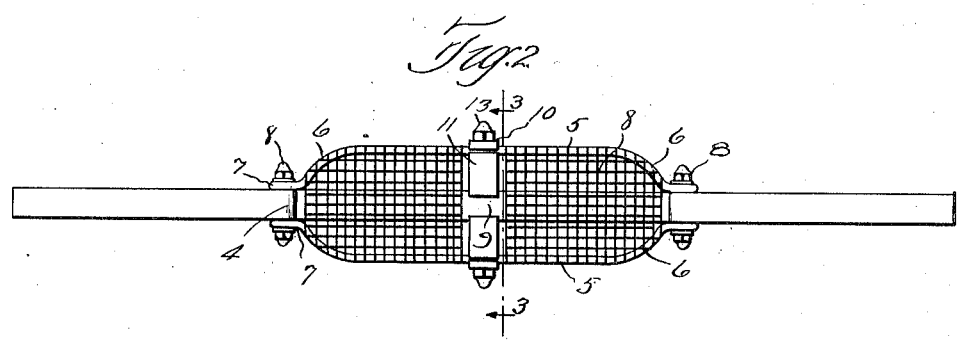
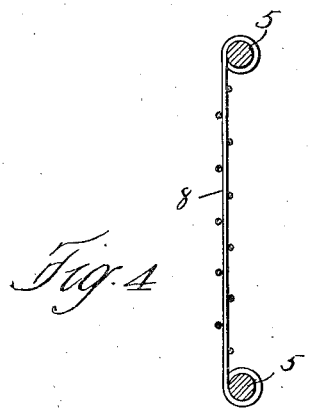
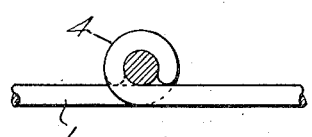
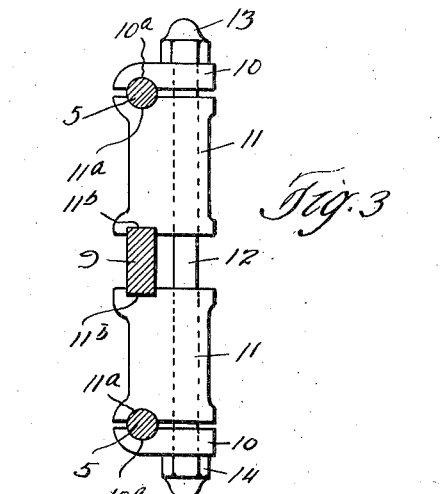

Patented Sept. 15, 1925.

1,553,999

UNITED STATES PATENT OFFICE.

CHRISTIAN GIRL, OF KALAMAZOO, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed January 16, 1922. Serial No. 529,651.

*To all whom it may concern:*

Be it known that I, CHRISTIAN GIRL, a citizen of the United States, residing at Kalamazoo, in the county of Kalamazoo and State of Michigan, have invented a certain new and useful Improvement in Automobile Bumpers, of which the following is a full, clear, and exact description, reference being had to the accompanying drawings.

This invention relates to bumpers for use with automobiles, and has for its general object to provide a bumper of this character which will perform in an efficient manner all of the functions required of such bumpers. A further object of the invention is to provide bumpers of this character, and more particularly bumpers of the resilient-bar type, with a widened impact portion which is not only capable of effectively resisting shocks due to collisions with other vehicles, but of reducing to a minimum the danger of injury to other vehicles and to pedestrians. I accomplish these objects and at the same time provide a bumper which is comparatively economical of production in and through the arrangement of parts shown in the drawings, wherein Fig. 1 represents a plan view of a bumper embodying my invention, indicating the manner in which the same is supported from the side members of an automobile; Fig. 2 a front elevation of the bumper shown in the preceding view; Fig. 3 a detail in section corresponding to the line 3—3 of Fig. 2 and looking in the direction of the arrows; Fig. 4 a similar view, corresponding to the line 3—3 of Fig. 2, but looking in the opposite direction from the arrows; and Fig. 5 is a plan view of the connection between the impact portion of the bumper and the adjacent portion thereof, a part of the eye on the inner member being broken away.

Describing the various parts herein by reference characters, 1 denotes the end portions of the front or impact section of a resilient bar (preferably a flat spring plate) and 2 the corresponding rear end portions of said bar or plate, the rear end portions being united to the front end portions by loops 3. The end of each portion 1 is provided with an eye 4. These eyes are connected by means of an upper and a lower bar, each of said bars being provided with eyes for attachment to the eyes 4 and the said connecting bars being offset vertically in opposite directions whereby they provide a widened central impact area for the bumper. The central portion of each of the connecting bars is indicated at 5, said central portions extending substantially parallel to each other and being spaced apart, the central portions being connected by curved inclined end portions 6 with eyes 7 adapted to be applied to the top and bottom of each of the eyes 4 and to be secured thereto as by means of bolts 8, each bolt extending through an upper eye 7, an intermediate eye 4, and a lower eye 7.

The bars 5, 6 provide a frame for a heavy wire netting, preferably of spring steel, indicated generally at 8. This netting is fastened to this frame by bending the ends of the wires around such bars, as indicated clearly in Fig. 4.

The widened impact section is strengthened by projecting the central portion of the rear section of the bumper between the central portions of the bars 5, as indicated at 9. The bars 5 and the section 9 of the main bar are united by means of a sectional clamp, shown in detail in Fig. 3. This clamp comprises a pair of upper and lower symmetrical members 10, each having a rounded recessed seat 10$^a$ therein for the cooperating portion of a bar 5; also a pair of intermediate members 11 each having a rounded recessed seat 11$^a$ complementary to the cooperating seat 10$^a$ and cooperating therewith to firmly clamp a round bar or wire 5 therebetween. In addition, each of the intermediate clamping members is provided at its opposite ends with a recessed seat 11$^b$, said seats cooperating with the opposite edges of the middle portion 9 of the rear section of the main bumper bar. The clamping members 10 and 11, having been applied to their bumper parts, are securely clamped thereto by means of a bolt 12 having a head 13 at one end and a nut 14 at the other end.

The bumper as thus constituted may be supported in any desired manner, as by means of clamps 15 applied to the rear portions 2 of the bumper and pivotally connected to supporting arms or brackets 16, as indicated at 17. The central portion of the bumper, provided with the net 8, may be of any desired length and may, in fact, occupy substantially the full length of the front or impact section of the bumper. The bars 5, being of round stock, may be made of ordinary rod stock, and, being braced by the rear section of the bumper, constitute therewith a cheap and strong support for the network 8.

Having thus described my invention, what I claim is:

1. A bumper comprising a rear main bar of flat plate material having front end portions, said front end portions being spaced apart and each provided with an eye, a pair of round bars each having an eye at each end thereof adapted to register with the first mentioned eyes and having their intermediate portions offset in opposite directions, bolts connecting the eyes of said round bars with the eyes of such end portions, and a net-work secured to the said round bars.

2. A bumper comprising a rear main bar of flat plate material having front end portions, said front end portions being spaced apart and each provided with an eye, a pair of round bars each having an eye at each end thereof adapted to register with the first mentioned eyes and having their intermediate portions offset in opposite directions, and bolts connecting the eyes of said round bars with the eyes of such end portions.

3. A bumper comprising a rear main bar of flat plate material having front end portions, said front end portions being spaced apart and each provided with an eye, a pair of round bars each having an eye at each end thereof adapted to register with the first mentioned eyes and having their intermediate portions offset in opposite directions, bolts connecting the eyes of said round bars with the eyes of such end portions, a net-work secured to the said round bars, the central portion of the rear bar extending between the corresponding portions of the last mentioned bars, and clamping means for securing together the said portions of said bars.

4. A bumper comprising a rear flat plate having spaced front end portions, a pair of rods connecting the said end portions and having their central portions offset vertically, the central portion of the rear plate being bent forward in substantial alignment with the central portions of the said rods, means securing together the central portions of said rods and plate, and a net-work secured to said rods.

5. A bumper comprising a main bar, a pair of rods connected with said main bar and having their central portions offset vertically in opposite directions, and a net-work secured to said rods.

6. The combination, with a bumper comprising an upper and a lower round bar and an intermediate flat bar, of means for securing said bars together, said means comprising an upper and a lower clamping member each having a recessed seat therein and a pair of intermediate clamping members each having at one end a recessed seat cooperating with the recessed seat in the corresponding member located exteriorly thereto and each also having its inner end provided with a recessed seat for the reception of the opposite edges of the intermediate plate, respectively, all of said members being apertured, and a bolt extending through said apertures and connecting the said clamping members and the bumper portions fitting in the seats thereof.

7. The combination, with a bumper comprising an upper and a lower round bar and an intermediate flat bar, of means for securing said bars together, said means comprising an upper and a lower clamping member each having a rounded recessed seat therein and a pair of intermediate clamping members each having at one end a rounded recessed seat cooperating with the rounded recessed seat in the corresponding member located exteriorly thereto and each also having its inner end provided with a recessed seat for the reception of the opposite edges of the intermediate plate, respectively, all of said members being apertured, and a bolt extending through said apertures and connecting the said clamping members and the bumper portions fitting in the seats thereof.

8. A bumper comprising a front or impact section having a pair of vertically spaced round bars and a rear flat bar arranged intermediate of the first two bars and connected at its ends to the ends of said bars, the rear bar having its intermediate portion projected between the intermediate portions of the first two bars, and means for clamping together the intermediate portions of such bars, the said means comprising an upper clamping member having a rounded seat in the lower surface thereof for the upper surface of the uppermost bar, a lower clamping member having a rounded seat in the upper surface thereof for the lower surface of the lowermost bar, and a pair of intermediate clamping members interposed between the intermediate bar and the uppermost and lowermost bars, respectively, each intermediate clamping member having at one end a rounded seat for the adjacent surface of the corresponding uppermost or lowermost bar and at its other end a rectangular seat for the adjacent surface of the intermediate bar, and means for securing the said clamping members together and in engagement with the aforesaid bars.

In testimony whereof, I hereunto affix my signature.

CHRISTIAN GIRL.